United States Patent
Hallberg

(10) Patent No.: US 9,450,681 B1
(45) Date of Patent: Sep. 20, 2016

(54) METHOD AND SYSTEM FOR WIRELESS TRANSMISSION OF QUATERNIONS

(71) Applicant: Sharp Laboratories of America, Inc., Camas, WA (US)

(72) Inventor: Bryan Severt Hallberg, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 14/707,194

(22) Filed: May 8, 2015

(51) Int. Cl.
  H04W 28/02 (2009.01)
  H04B 10/90 (2013.01)
(52) U.S. Cl.
  CPC .................... H04B 10/90 (2013.01)
(58) Field of Classification Search
  CPC ............ G06K 7/01; H04W 28/0252; H04W 28/0289
  USPC ........... 455/414.1, 41.2, 574, 556.1; 340/8.1, 340/10.1
  See application file for complete search history.

(56) References Cited

U.S. PATENT DOCUMENTS

| | | | |
|---|---|---|---|
| 7,672,781 B2 | 3/2010 | Churchill et al. | |
| 8,203,487 B2 | 6/2012 | Hol et al. | |
| 8,344,948 B2 | 1/2013 | Hol et al. | |
| 8,647,287 B2 | 2/2014 | Greenberg | |
| 8,920,345 B2 | 12/2014 | Greenberg et al. | |
| 8,947,206 B2 | 2/2015 | Dijkstra et al. | |
| 8,981,904 B2 | 3/2015 | Luinge et al. | |
| 2011/0109438 A1* | 5/2011 | Dijkstra | H04Q 9/00 340/8.1 |
| 2013/0110450 A1* | 5/2013 | Kulik | G01C 17/38 702/141 |
| 2015/0365842 A1* | 12/2015 | Bellusci | H04W 28/0289 370/230 |

\* cited by examiner

*Primary Examiner* — Blane Jackson
(74) *Attorney, Agent, or Firm* — Scot A. Reader

(57) ABSTRACT

A method and system for low latency, low power, high fidelity wireless transmission of quaternions provides superior performance of real-time applications that transmit and consume quaternions. The method and system provide a quaternion transmission protocol wherein quaternion sources, such as sensor units, construct quaternion update packets containing quaternions encoded in a notation that both conserves bandwidth and preserves angular resolution provided by quaternions. The update packets are transmitted on a wireless communication link to a quaternion destination, such as a data hub, which deconstructs and interprets the update packets.

16 Claims, 6 Drawing Sheets

METHOD AND SYSTEM FOR WIRELESS TRANSMISSION OF QUATERNIONS

BACKGROUND OF THE INVENTION

The present invention relates to wireless communication and, more particularly, wireless transmission of quaternions.

In three-dimensional space, any sequence of rotations of a coordinate system about a fixed point is mathematically equivalent to a single rotation by a given angle about a fixed axis running through the fixed point. Therefore, any rotational sequence in three dimensions can be represented as a function of a unit vector u and a rotation angle θ. Quaternions provide a simple way to express this in four numbers (a, b, c, d) computed by reference to a unit length vector having coordinates (x, y, z) relative to the x-, y- and z-axis, and a rotational angle θ, as follows:

$$a = \cos(\theta/2)$$

$$b = x^*\sin(\theta/2)$$

$$c = y^*\sin(\theta/2)$$

$$d = z^*\sin(\theta/2)$$

Due to the ability of quaternions to describe spatial orientation and rotation of three-dimensional objects in mathematically efficient terms, quaternions have found many practical applications. For example, quaternions are used in various systems that track human movement in real-time, such as fall detection, stride monitoring, range-of-motion tracking, flexibility tracking and ergonomics monitoring. In such systems, sensor units mounted on the human body take frequent measurements (e.g., rotation, acceleration, magnetic field strength) which are converted into quaternions representing the current spatial orientation of the sensors relative to Earth. The quaternions are transmitted wirelessly to a destination computer for processing and analysis, either directly or via a wireless hub.

One shortcoming of real-time systems that transmit and consume quaternions is that known wireless communication protocols are not conducive to low latency, low power, high fidelity transmission of quaternions, especially where multiple quaternion sources transmit quaternions to a single quaternion destination over a shared wireless link. Indeed, the deficiencies in known wireless protocols with regard to quaternion transmission can render such systems prone to more frequent delays (e.g., due to transmission bottlenecks), reduced system uptime (e.g., due to sensor unit battery drain) and reduced computational accuracy (e.g., due to low data resolution).

One deficiency in known wireless protocols with regard to quaternion transmission is the absence in such protocols of predefined quaternion fields. The absence of predefined quaternion fields means extra overhead is required to specify the location and format of the quaternions being transmitted using such protocols, increasing transmission latency and system power consumption.

Furthermore, spatial orientation quaternions involve cosine and sine functions whose values vary little with angular change near +1 and −1 as compared with angular change near 0. Known wireless protocols do nothing to facilitate quaternion expression in a manner that preserves angular resolution for quaternion values near +1 or −1, which can reduce the accuracy of results computed using transmitted quaternions.

SUMMARY OF THE INVENTION

The present invention provides a method and system conducive to low latency, low power, high fidelity wireless transmission of quaternions, resulting in superior performance of real-time systems that transmit and consume quaternions. These and other advantages are realized through a novel quaternion transmission protocol. In the quaternion transmission protocol, quaternion sources, such as sensor units, construct quaternion update packets containing quaternions encoded in a predefined notation that both conserves system bandwidth and preserves angular resolution provided by the quaternions. The update packets are transmitted on a wireless communication link to a quaternion destination, such as a data hub, which deconstructs and interprets the update packets.

In one aspect of the invention, a system for wireless transmission of quaternions comprises a quaternion source configured to construct a quaternion update packet containing a quaternion at predefined bit positions and in a predefined fixed bit length format specified by a quaternion transmission protocol and transmit the update packet on a wireless communication link; and a quaternion destination configured to receive the update packet off the wireless link and interpret the update packet.

In some embodiments, the quaternion is expressed in the update packet as four bit sequences of a common length representing four constituent elements of the quaternion.

In some embodiments, the quaternion is expressed in the update packet in a compressed form.

In some embodiments, the fixed bit length format comprises mantissa bit positions and exponent bit positions.

In some embodiments, the fixed bit length format further comprises sign bit positions.

In some embodiments, the quaternion is encoded in the update packet in a format that provides increasing resolution of values of constituent elements of the quaternion with proximity to +1 and −1.

In some embodiments, the update packet further contains a quaternion flag at a predefined bit position specified by the quaternion transmission protocol signifying to the quaternion destination that the update packet contains the quaternion at the bit positions and in the fixed bit length format.

In some embodiments, the update packet is transmitted during a time division multiple access (TDMA) time slot assigned to the quaternion source and no other quaternion source.

In some embodiments, the quaternion source is configured to receive from the quaternion destination a quaternion acknowledgement packet in response to the update packet.

In some embodiments, the acknowledgement packet contains timing correction information signifying to the quaternion source a timing correction for a clock on the quaternion source.

In some embodiments, the acknowledgement packet contains a sequence number signifying to the quaternion source which update packet is being acknowledged.

In some embodiments, the quaternion source is configured to receive the acknowledgement packet during a TDMA time slot assigned to the quaternion source and no other quaternion source.

In some embodiments, the quaternion represents a spatial orientation of the quaternion source.

In some embodiments, the quaternion source is configured to compute the quaternion based on measurements of acceleration, rotation and magnetic field.

In some embodiments, the quaternion source is configured to convert the quaternion into the fixed bit length format.

In some embodiments, the quaternion source comprises a motion sensor unit.

In some embodiments, the quaternion destination comprises a data hub.

In some embodiments, the quaternion destination comprises a client device.

In another aspect of the invention, a system for wireless transmission of quaternions comprises a plurality of quaternion sources, each of the quaternion sources configured to construct a quaternion update packet containing a quaternion at predefined bit positions and in a predefined fixed bit length format specified by a quaternion transmission protocol and transmit the update packet on a shared wireless communication link during a TDMA time slot assigned to the quaternion source and no other quaternion source; and a quaternion destination configured to assign the TDMA time slots to the quaternion sources, receive the update packets off the wireless link and interpret the update packets.

In yet another aspect of the invention, a method for wireless transmission of quaternions comprises constructing, by a quaternion source, a quaternion update packet containing a quaternion at predefined bit positions and in a predefined fixed bit length format specified by a quaternion transmission protocol; transmitting, by the quaternion source, the update packet on a wireless communication link; receiving, by a quaternion destination, the update packet off the wireless link; and interpreting, by the quaternion destination, the update packet.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
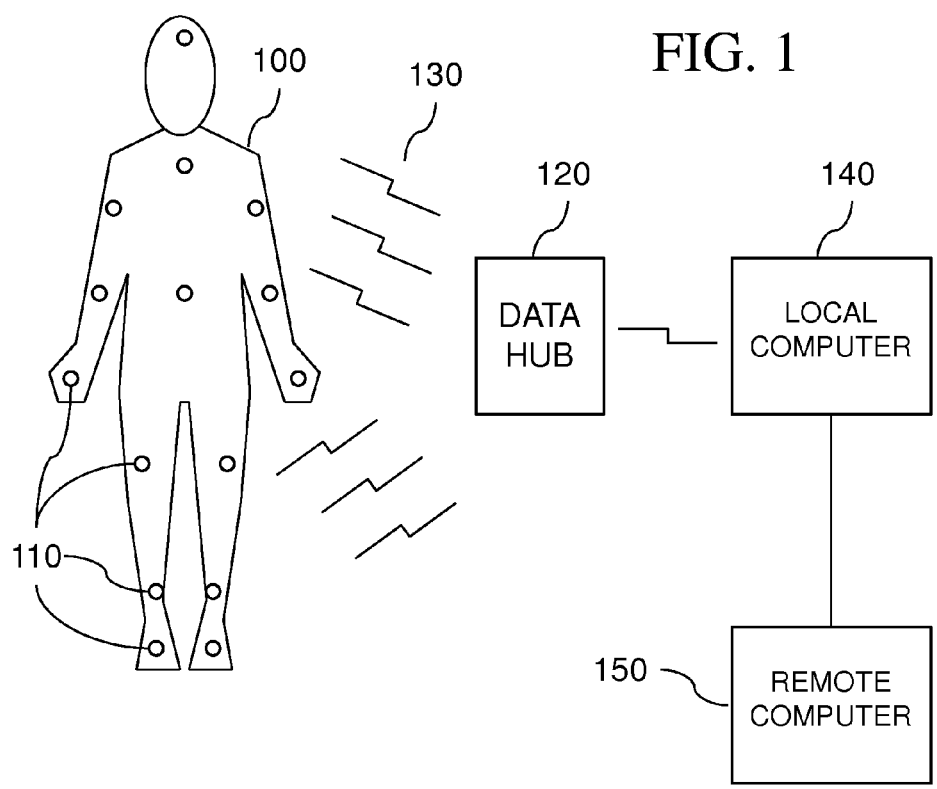
FIG. 1 shows a system for wireless transmission of quaternions in some embodiments of the invention.

FIG. 1 shows a system 10 for wireless transmission of quaternions in some embodiments of the invention. In system 10, a multiple of spatial orientation sensor units 110 are mounted to major muscular-skeletal body parts of a human subject 100. Sensor units 110 may be powered by batteries or other means. Sensor units 110 take real-time measurements and convert the measurements into quaternions representing the spatial orientation of sensor units 110. Sensor units 110 transmit the quaternions to a data hub 120 over a shared wireless communication link 130. Data hub 120 relays the quaternions to a local computer 140 for processing and analysis and display of results generated through such processing and analysis. Local computer 140 may further relay the quaternions or results generated therefrom to a remote computer 150 for additional processing and analysis or sharing.

Shared wireless link 130 between sensor units 110 and data hub 120 operates on the 2.4 GHz industrial, scientific and medical (ISM) radio band and carries packets constructed using a highly efficient quaternion transmission protocol described herein. Communication between data hub 120 and local computer 140 uses the Bluetooth or Wi-Fi wireless communication protocols. Communication between local computer 140 and remote computer 150 traverses the Internet or a private intranet and uses TCP/IP. In some embodiments, sensor units 110 communicate directly with local computer 140 over a shared wireless link, rather than indirectly through data hub 120.

Quaternions transmitted in system 10 are used by local computer 140 and, in some contexts, by remote computer 150 to generate parametric data for one or more applications that track human movement in real-time. Such applications fall into three categories based on the number of sensor units required to compute the parameters of interest. Single-sensor applications such as aging in-place, fall detection and stride monitoring applications use one body-mounted sensor unit. In these applications, the wireless link between sensor unit and data hub is a dedicated link. Dual-sensor applications such as range of motion tracking, joint recovery, arthoplasty and ligament repair applications use two body-mounted sensor units. Multi-sensor applications such as personal sports coach, flexibility tracking, ergonomics monitoring and health gaming applications use three or more body-mounted sensor units. Accordingly, the number and body placement of sensor units 110 in FIG. 1 is exemplary and will vary with the parameters of interest in a given application.

Sensor units 110 have inertial motion unit (IMU) sensors that measure rotation, acceleration and magnetic field strength in three orthogonal directions. Sensor units 110 have internal processors which use these measurements to compute quaternions representing the current spatial orientation of sensor units 110 relative to Earth. Sensor units 110 each include a gyroscope which measures rotation, an accelerometer which measures the direction of gravity (i.e., down) and a magnetometer which measures magnetic field strength from which down and north directions can be estimated for a known latitude. Inputs from the gyroscope, accelerometer and magnetometer are provided to the internal processor which combines the inputs using a sensor fusion algorithm to compute the current spatial orientation of sensor units 110. For example, rotation measured by the gyroscope of one of sensor units 110 integrated over time provides an estimate of spatial orientation. However, since this estimate includes an error component which accumulates over time if not corrected, the internal processor uses the acceleration measured by the accelerometer and the magnetic field strength measured by the magnetometer to determine the difference between where down and north are according to the gyroscope, on the one hand, and according to the accelerometer and magnetometer, on the other, and make corrective adjustments to the gyroscopic estimate. The internal processor of the one of sensor units 110 then converts the corrected spatial orientation estimate into a quaternion. Additionally, the internal processor transforms the quaternion into protocol optimized bit sequences for encoding in an update packet conformant with a quaternion transmission protocol described herein. These protocol optimized bit sequences express the quaternion in a manner that conforms to a predefined fixed bit length format for quaternion expression specified by the quaternion transmission protocol and provides increasing resolution with proximity of quaternion values to +1 and −1. The protocol optimized bit sequences are encoded in a quaternion update packet at predefined bit positions specified by the quaternion transmission protocol and are transmitted to data hub 120 on shared wireless link 130 by a wireless transceiver on the one of sensor units 110.

Sensor units 110 also receive quaternion acknowledgement packets in a quaternion transmission protocol format from data hub 120 off shared wireless link 130 and deconstruct and interpret such packets.

Sensor units 110 perform packet construction and deconstruction using their internal processors, in transceiver hardware, or in some combination. Sensor units 110 also have non-volatile data storage elements which store sensor unit identifiers (SUIDs) uniquely assigned to sensor units 110. SUIDs determine which time slots sensor units 110 use to transmit quaternion update packets and other packets, such as status, command and calibration packets, to data hub 120, and determine which time slots sensor units 110 listen in for quaternion acknowledgement packets from data hub 120.

Data hub 120 receives quaternion update packets in a quaternion transmission protocol format from sensor units 110 off shared wireless link 130 and deconstructs and interprets such packets. Data hub 120 also constructs quaternion acknowledgement packets in a quaternion transmission protocol format and transmits such packets to sensor units 110 on shared wireless link 130. Packet construction and deconstruction may be performed on data hub 120 by an internal processor, in transceiver hardware, or in some combination. Data hub 120 also has a Bluetooth (BT SPP, BT Smart, etc.) or Wi-Fi interface over which data hub 120 relays quaternions with the associated SUIDs of sensor units 110 from which the quaternions were received to local computer 140 for processing and analysis. In some embodiments, data hub 120 additionally has a data storage element, such as a secure digital (SD) card, which locally stores quaternions in association with the SUIDs of sensor units 110 from which they were received. Such a data storage element can preserve quaternion data during periods when the wireless link between data hub 120 and local computer 140 is inactive. Moreover, in some embodiments data hub 120 and local computer 140 may not communicate over a wireless link and quaternions may be transferred to local computer 140 by manually moving an SD card having quaternions stored thereon between data hub 120 and local computer 140.

Local computer 140 is a wireless client device, such as a smartphone, tablet computer, notebook computer, or wireless-enabled desktop computer, which processes and analyzes quaternions received from data hub 120 to generate parametric data for one or more applications that track movement of human subject 100 in real-time. Local computer 140 has a user interface allowing a user of system 10, who may be human subject 100 or another user, to review the parametric data. Local computer 140 may upload quaternions or parametric data generated therefrom to a remote computer 150 for additional processing and analysis or sharing. Remote computer 150 may be, for example, a computer operated by a medical provider or a social networking platform.

Sensor units 110 communicate with data hub 120 in round-robin order by transmitting and receiving packets during respective time slots in a repeating TDMA frame. Sensor units 110 and data hub 120 construct quaternion update packets and acknowledgement packets, respectively, using a highly efficient quaternion transmission protocol notation that conserves system bandwidth and power and preserves resolution provided by quaternions.

Figure 2:
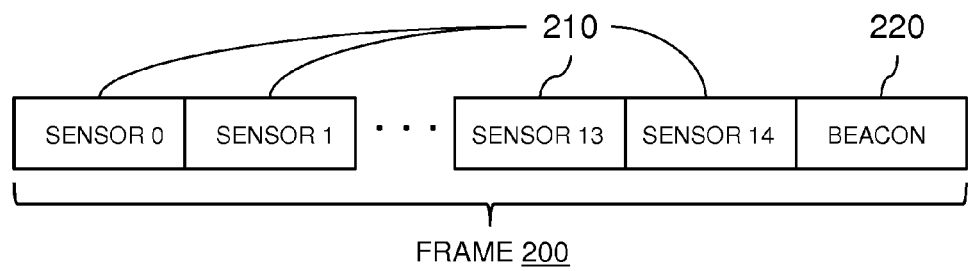
FIG. 2 shows a representative TDMA frame used for bidirectional communication in the system of FIG. 1.

FIG. 2 shows a representative TDMA frame 200 used for bidirectional communication between sensor units 110 and data hub 120 over shared wireless link 130. Frame 200 has sixteen time slots. The first fifteen time slots are sensor time slots 210 uniquely assigned to the fifteen sensor units 110 for transmitting packets to data hub 120 and receiving packets from data hub 120. The sixteenth time slot is a beacon time slot 220 used by all of the sensor units 110 to facilitate synchronization with data hub 120 and configuration of system 10. Frame 200 precedes and follows other TDMA frames which follow the same convention. In some embodiments, the duration of each TDMA frame 200 is 20 Hz, such that the duration of each one of time slots 210 is 3.125 milliseconds.

Figure 9:
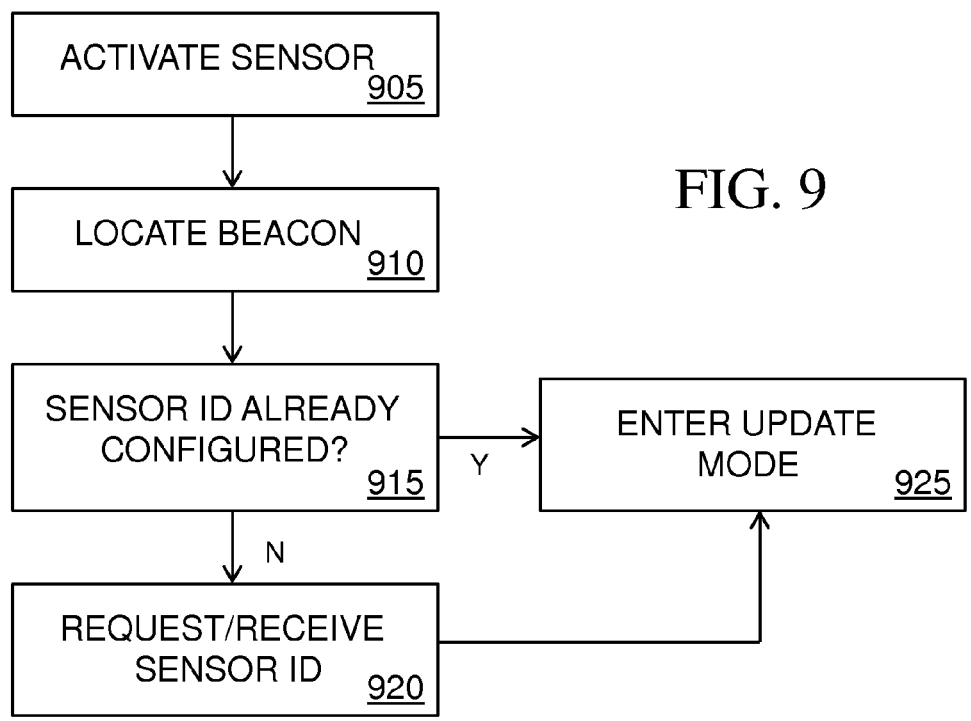
FIG. 9 shows an initialization method performed by sensor units upon activation within the system of FIG. 1.

An initialization method performed by sensor units 110 upon activation will now be described by reference to FIG. 9. When a sensor unit is activated (905), the sensor unit begins listening for a beacon packet transmitted by data hub 120. The beacon packet is sent at the beginning of the beacon time slot in each TDMA frame and contains a unique address distinguishing it from non-beacon packets. An example of this address is the byte sequence "Hub". When the sensor unit locates the beacon packet (910), if the sensor unit already has its uniquely assigned SUID stored locally on the sensor unit (915), the sensor unit enters update mode and starts transmitting quaternion update packets during the one of sensor time slots in the TDMA frame associated with its SUID (925). If the sensor unit does not yet have its SUID, the sensor unit transmits a SUID request to data hub 120 during the beacon time slot. The SUID request contains the same address used in the beacon packet. Data hub 120 relays the SUID request to local computer 140 which responds by providing a SUID to the sensor unit (920). The sensor unit stores the SUID to its local non-volatile memory and enters quaternion update mode. The SUID assigned by local computer 140 to the sensor unit corresponds with the muscular-skeletal body part monitored by the sensor unit. This body part may be determined by local computer 140 from information provided by the sensor unit in the SUID request. In some embodiments, SUIDs are numbers from 0 to 14, inclusive.

Figure 3:
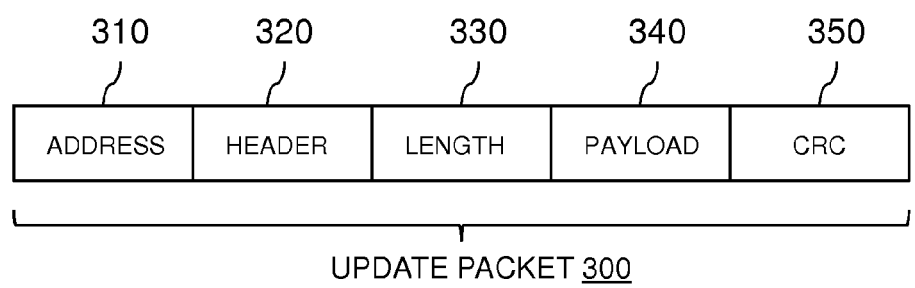
FIGS. 3-6 show a representative quaternion update packet used for transmitting quaternions in the system of FIG. 1.

FIGS. 3-6 show a representative quaternion update packet 300 transmitted by one of sensor units 110 to data hub 120 in the system of FIG. 1. Update packet 300 has predefined quaternion fields conformant with a quaternion transmission protocol notation. It should be noted at the outset that the precise position, length and format of these fields is exemplary and will vary in different embodiments of the invention. Referring to FIG. 3, update packet 300 contains an address field 310. Address field 310 is three bytes long and includes a system address that is commonly used by all of the sensor units 110 in system 10 for transmitting update packets. In some embodiments, the system address is the byte sequence "Sns". Except during the beacon time slot, data hub 120 discards packets received over shared wireless link 130 which do not have the system address in the address field. This prevents data hub 120 from processing packets sent by wireless devices which are not part of system 10.

Figure 4:
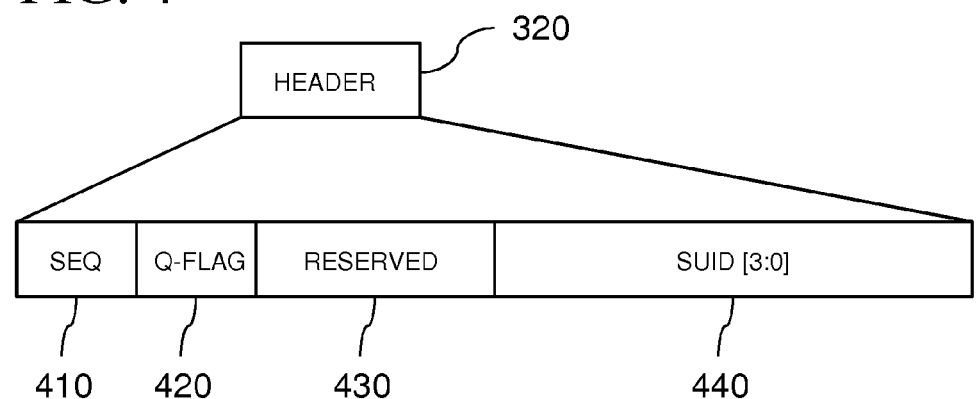

Following address field 310, update packet 300 has a two-byte header field 320. Referring to FIG. 4, header field 320 starts with a one-bit sequence number field (SEQ) 410 containing a sequence number that alternates between "0" or a "1" for each update packet sent. The sequence number is returned in a quaternion acknowledgement packet from data hub 120 acknowledging update packet 300, ensuring that data hub 120 receives every update packet. Update packets that are not acknowledged by data hub 120 are resent by sensor units 110. Header field 320 next has a one-bit quaternion flag field (Q-FLAG) 420 containing a flag indicating whether the packet is a quaternion update packet or not. If the flag is set (i.e., the Q-FLAG field contains a "1"), the field signifies to data hub 120 that the packet is a quaternion update packet which contains a quaternion at predefined bit positions and in a predefined fixed bit length format specified by the quaternion transmission protocol. If the flag is not set (i.e., the Q-FLAG field contains a "0"), the field signifies to data hub 120 that the packet is not a quaternion update packet, but another type of packet such as a status, command or calibration packet. Header field 400 next has a two-bit reserved field 430 that is unused. Header field 320 finally has a four-bit SUID field 440 containing the SUID of the sensor unit that is the source of the packet. Data hub 120 discards packets received over shared wireless link 130 which contain SUIDs of sensor units that are not entitled to transmit in the time slot when the packet is received.

Following header field 320, update packet 300 has a length field 330. Length field 330 is one byte long and contains a number indicating the length in bytes of a payload field 340 that immediately follows length field 330.

Figure 5:
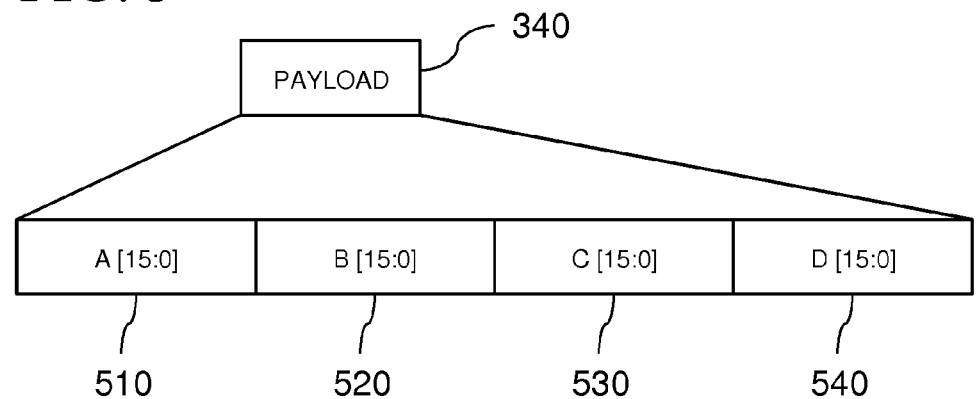
Figure 6:
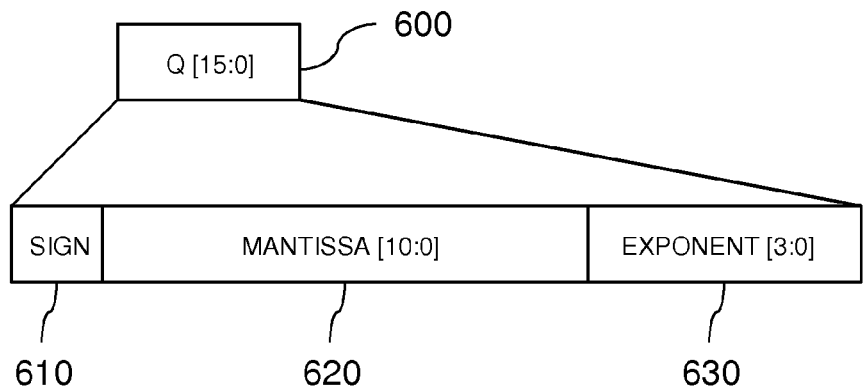

Following length field 330, update packet 300 has payload field 340. Referring to FIG. 5, payload field 340 is eight bytes long and consists of four quaternion element fields (A) 510, (B) 520, (C) 530 and (D) 540 that express the four constituent elements of a quaternion being transmitted in protocol optimized bit sequences that each conform to a 16-bit formatting convention specified by the quaternion transmission protocol and provide increasing resolution with proximity of quaternion values to +1 and −1. The common format of quaternion element fields 510, 520, 530, 540 is shown in FIG. 6 by reference to a generic quaternion element field (Q) 600. Generic field 600 starts with a one-bit sign field 610 indicating whether the quaternion value that immediately follows is positive or negative. If field 610 contains a "1", field 610 signifies to data hub 120 that the quaternion value that follows is a negative value. If field 610 contains a "0", field 610 signifies to data hub 120 that the quaternion value that follows is a positive value.

Generic field 600 next has an 11-bit mantissa field 620 followed immediately by a 4-bit exponent field 630. Mantissa field 620 and exponent field 630 are populated as follows:

First, the one of sensor units 110 constructing update packet 300 computes a spatial orientation quaternion based on fused measurements of rotation, acceleration and magnetic field strength. The quaternion has four constituent elements which are initially expressed as floating point values. The sensor unit converts each of the constituent elements from a floating point value (q) into a fixed point value (f) using the following transform function:

$$f=(2^{26}-1)*(1-|q|)$$

The transform function is designed to generate smaller fixed point values for quaternion values near +1 and −1 as compared with quaternion values near 0, which preserves greater resolution for quaternion values near +1 and −1 when these fixed point values are compressed, by removing insignificant bits, into bit sequences conforming with the 16-bit sign-mantissa-exponent (SME) format defined by the quaternion transmission protocol. Since spatial orientation quaternions involve cosine and sine functions whose values vary little with angular change near +1 and −1 as compared with angular change near 0, this added resolution for quaternion values near +1 and −1 allows the quaternion to provide greater angular resolution, and therefore superior computational integrity, when used on local computer 140 or remote computer 150 to generate parametric data.

The sensor unit then compresses the fixed point values produced by the transfer function into 16-bit protocol optimized bit sequences conformant with the SME format as follows:

1. The sign of the floating point value q is converted into a single bit which is "1" if q is negative and "0" if q is not negative.
2. The fixed point value f is initially expressed as a 26-bit binary sequence.
3. The 11-bit mantissa is extracted from the 26-bit binary sequence as the first bit of the sequence that is a "1" and the next ten bits, unless the first bit that is a "1" is one of the last eleven bits of the sequence. In that case, the mantissa consists of the last eleven bits of the sequence.
4. The four-bit exponent is the bit position number of the first bit of the sequence that is a "1", unless the first bit that is a "1" is one of the last 11 bits of the sequence. In that case, the exponent is 15.

The protocol optimized bit sequences are then encoded in sign field 610, mantissa field 620 and exponent field 630 of update packet 300.

Exemplary transformations of floating point quaternion elements into 16-bit protocol-optimized bit sequences following the SME format are provided below.

Example 1 q=0

$$f=[(2^{26})-1]*(1-|0|)=67,108,863*1=67,108,863$$

26-bit Binary Sequence="11 1111 1111 1111 1111 1111 1111"
Sign="0"
Mantissa="111 1111 1111"
Exponent=0

Example 2 q=−1

$$f=[(2^{26})-1]*(1-|-1|)=67,108,863*0=0$$

26-bit binary sequence="00 0000 0000 0000 0000 0000 0000"
Sign="1"
Mantissa="000 0000 0000"
Exponent=15

Example 3 q=0.999966398

$$f=[(2^{26})-1]*(1-|0.999966398|)=67,108,863*0.000033602=2225$$

26-bit binary sequence="00 0000 0000 0000 1000 1100 1111"
Sign="0"
Mantissa="100 0110 0111"

Exponent=14

Example 4 q=0.999999121

$f=[(2^{26})-1]*(1-|0.999999121|)=67,108,863*0.000000879=59$ 26-bit binary sequence="00 0000 0000 0000 0000 0011 1011"
Sign="0"
Mantissa="000 0011 1011"
Exponent=15

Example 5 q=−0.49511711

$f=[(2^{26})-1]*(1-|-0.49511711|D=67,108,863*0.500488289=33,587,200$ 26-bit binary sequence="10 0000 0000 1000 0000 0000 0000"
Sign="1"
Mantissa="100 0000 0001"
Exponent=0

Following payload field 340, update packet 300 has a one-byte cyclic redundancy check (CRC) field 350. CRC field 350 contains a checksum used to validate that update packet 300 was received without corruption.

Figure 7:
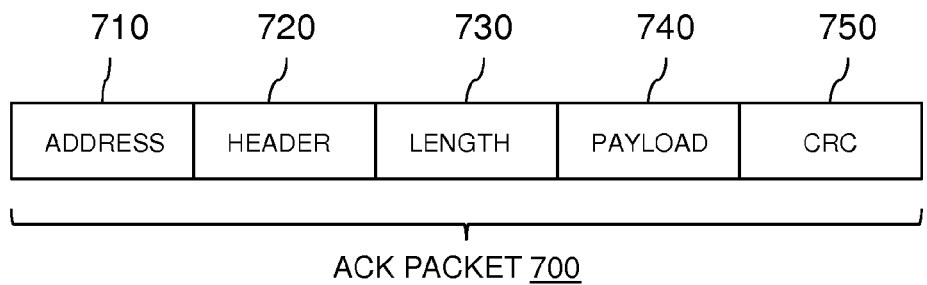
FIGS. 7 and 8 show a representative quaternion acknowledgment packet used for acknowledging quaternion update packets in the system of FIG. 1.
Figure 8:
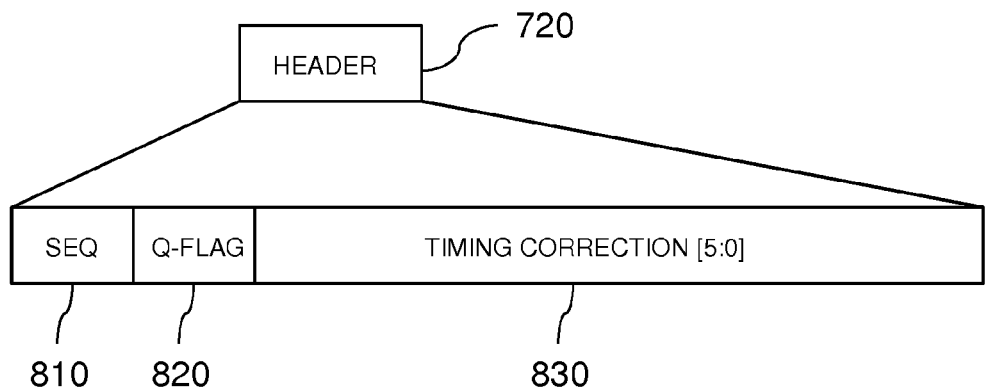

FIGS. 7 and 8 show a representative quaternion acknowledgement (ACK) packet 700 transmitted by data hub 120 to sensor units 110 in the system of FIG. 1. A quaternion acknowledgment packet is sent by data hub 120 for every quaternion update packet received from sensor units 110 having a valid CRC. Acknowledgement packet 700 is encoded in a quaternion transmission protocol format having predefined fields. Referring to FIG. 7, acknowledgement packet 700 contains an address field 710. Address field 310 is three bytes long and includes an address that uniquely identifies the one of sensor units 110 that sent the update packet being acknowledged. In some embodiments, the address is the byte sequence "Sn"x, where x is the SUID of the sensor unit whose update packet is being acknowledged. This prevents other ones of sensor units 110 from processing acknowledgment packet 700.

Following address field 710, acknowledgment packet 700 has a two-byte header field 720. Referring to FIG. 8, header field 720 starts with a one-bit sequence number field (SEQ) 810 containing a sequence number that alternates between "0" or a "1" for each acknowledgement packet sent. The sequence number is set to match the number contained in the update packet being acknowledged. Header field 720 next has a one-bit quaternion flag field (Q-FLAG) 820 containing a flag indicating whether the packet is a quaternion acknowledgement packet or not. If the flag is set (i.e., the Q-FLAG field contains a "1"), the field signifies to the receiving sensor unit that the packet is a quaternion acknowledgment packet which contains timing correction data in a notation specified by the quaternion transmission protocol. If the flag is not set (i.e., the Q-FLAG field contains a "0"), the field signifies to the receiving sensor unit that the packet is not a quaternion acknowledgement packet, but another type of packet.

Header field 720 lastly has a six-bit timing correction data field 830 specifying a timing adjustment that the receiving sensor unit must make to correct drift relative to data hub 120. In this regard, each one of sensor units 110, and data hub 120, has its own clock which units 110 and data hub 120 consult to determine their times of packet transmission on shared wireless link 130 and expected times of packet reception off shared wireless link 130 in the TDMA scheme. These clocks drift relative to each other, requiring a synchronization technique to prevent drift into neighboring time slots. Accordingly, when data hub 120 receives a quaternion update packet from one of sensor units 110, data hub 120 determines the time difference between when the packet address field arrived and when the packet address field was expected to arrive according to the clock on data hub 120. The address field is used to determine the time difference since its location in update packets is not dependent on packet length. Data hub 120 encodes the time difference in timing correction data field 830. The sensor unit receiving acknowledgement packet 700 adjusts its clock based on this time difference if the acknowledgement packet 700 is in acknowledgement of the first update packet sent by the sensor unit during the time slot. The six-bit timing correction data field 830 with one microsecond bit resolution allows each of sensor units 110 to adjust its clock by up to +/−31 microseconds during each TDMA frame. At a frame rate of 20 Hz, timing drifts as large as 31/50,000 or 640 parts per million can thus be corrected without additional synchronization overhead, such as having to search for the beacon packet during every TDMA frame.

Following header field 720, acknowledgement packet 700 has a length field 730. Length field 730 is one byte long and contains a number indicating the length in bytes of a payload field 740 that immediately follows length field 730. In some embodiments, acknowledgement packet 700 does not contain a payload. In that event, the number encoded in length field 730 is zero and payload field 740 is empty.

Following payload field 740 (or following length field 730 if there is no payload), acknowledgement packet 700 has a one-byte CRC field 750 containing a checksum used to validate that acknowledgement packet 700 was received without corruption.

Figure 10:
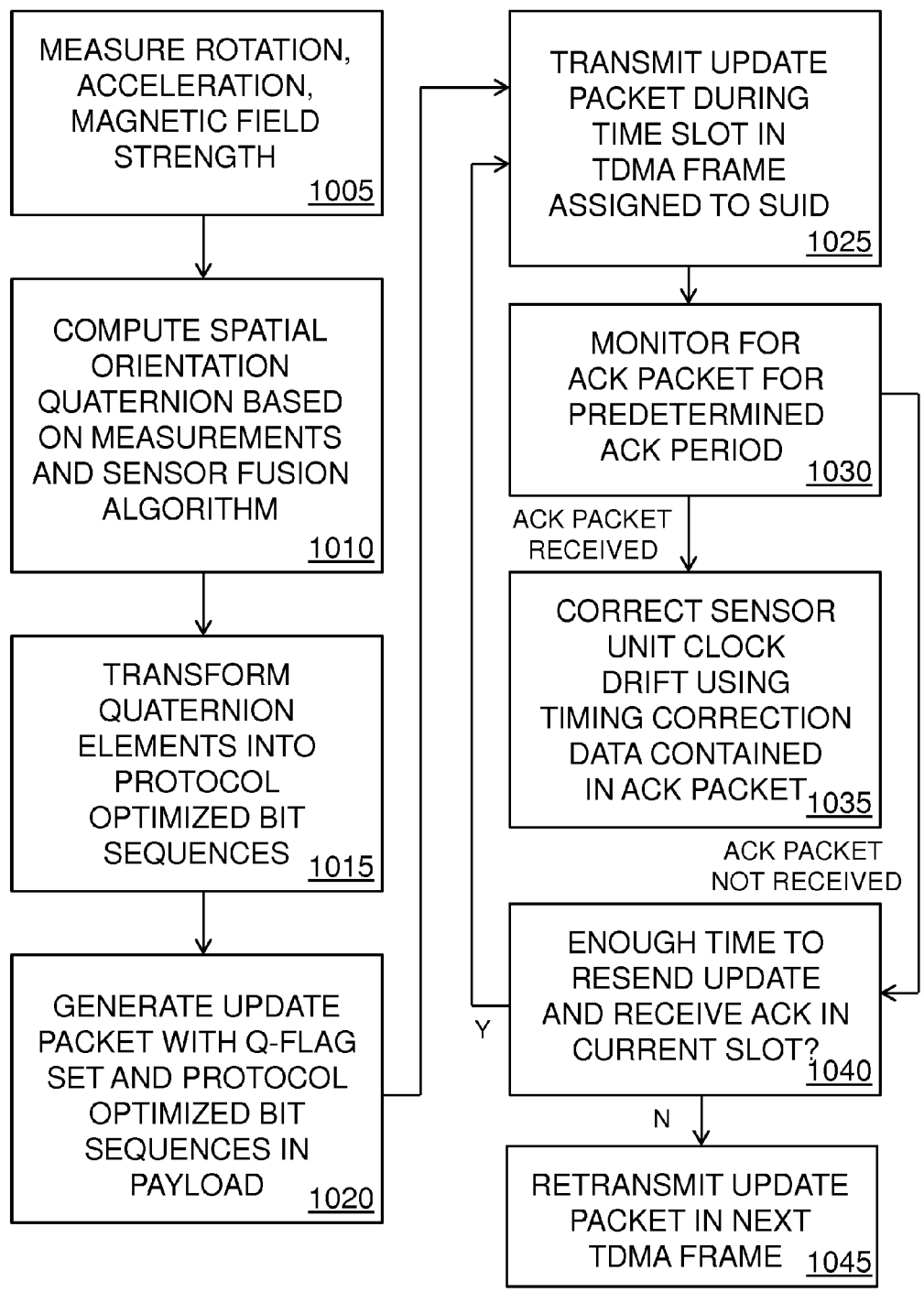
FIG. 10 shows a method performed by sensor units while in update mode within the system of FIG. 1.

A method performed by sensor units 110 in quaternion update mode will now be described by reference to FIG. 10. Once the sensor unit has been initialized, its IMU sensors measure rotation, acceleration and magnetic field strength (1005). The sensor unit's internal processor fuses these measurements to compute a quaternion representing the current spatial orientation of the sensor unit (1010). The sensor unit's internal processor then converts the four constituent elements of the quaternion from floating point values into protocol optimized bit sequences defined by a quaternion transmission protocol format (1015). In this regard, a transform function is applied to convert the floating point values into fixed point values, wherein smaller fixed point values are generated for quaternion values near +1 and −1 as compared with quaternion values near 0. The fixed point values are then compressed into bit sequences conforming with the 16-bit per element predefined SME format specified by the quaternion transmission protocol which preserves greater resolution for quaternion values near +1 and −1. The sensor unit's internal processor and/or transceiver hardware then generates a quaternion update packet with the Q-FLAG set and the protocol optimized bit sequences expressing the quaternion elements encoded at predefined bit positions in the payload in the SME format (1020). The sensor unit then transmits the update packet to data hub 120 on shared wireless link 130 during the time slot uniquely assigned to the sensor unit in the current TDMA frame (1025) and monitors for a predetermined period for a counterpart quaternion acknowledgement packet from data hub 120 (1030). If the sensor unit receives the acknowledgement packet within the predetermined period, the sensor unit adjusts its clock using the timing correction data contained in the acknowledgement packet (if the acknowledgement packet acknowledges the first update packet sent during the time slot) (1035). If, however, the sensor unit does not receive the acknowledgement packet within the predetermined period, the sensor unit determines whether there is enough time remaining in the time slot to resend the update packet and receive an acknowledgement packet (1040). If so, the update packet is resent (1025). If not, the sensor unit retransmits the update packet during its uniquely assigned time slot in the next TDMA frame (1045). Since the sensor unit did not receive an acknowledgement packet during the current timeslot, it also did not receive timing correction data for the current timeslot. To compensate for the possible clock drift of the current timeslot, the sensor unit uses the average value of recently previously received timing correction values to adjust its internal clock relative to data hub 120. Moreover, if the sensor unit fails to receive an acknowledgement packet for a predetermined extended period of time, the sensor unit re-performs the initialization method of FIG. 9 in order to reestablish synchronization with data hub 120.

A method performed by data hub 120 in quaternion acknowledgement mode will now be described by reference to FIG. 11. When data hub 120 receives a quaternion update packet having a valid CRC from one of sensor units 110 during that sensor unit's authorized time slot (1105), data hub 120 computes the time difference between when the packet address field arrived and when the packet address field was expected to arrive according to the clock on data hub 120 (1110) and generates a quaternion acknowledgement packet having the time difference encoded in the predefined timing correction data field (1115). Data hub 120 transmits the acknowledgement packet during the same time slot in the TDMA frame in which the update packet was received (1120). Data hub 120 extracts the protocol optimized bit sequences contained in the update packet, converts them into an application-ready quaternion (1125) and stores the quaternion locally (e.g., on a SD card) in association with the SUID of the sensor unit that sent the quaternion (1130). Data hub 120 also transmits the quaternion in association with its SUID to local computer 140 (1135), which uses the quaternion to generate spatial orientation data for use in one or more human movement tracking applications (1140).

Figure 11:
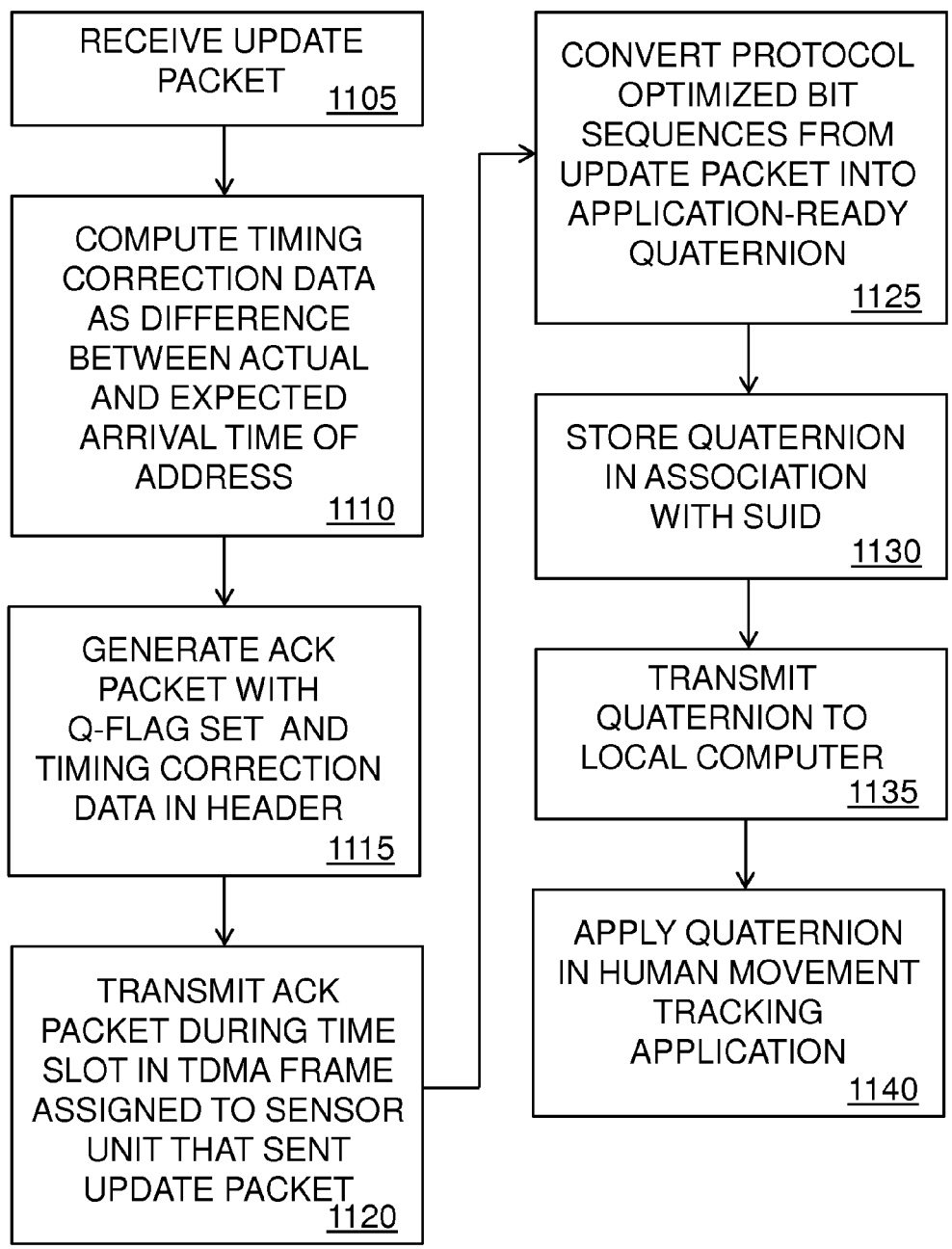
FIG. 11 shows a method performed by the data hub while in acknowledgement mode within the system of FIG. 1.

It bears noting that the method of FIG. 11 is purely exemplary. In other embodiments, data hub 120 may not locally store the quaternion and/or may relay the quaternion to local computer 140 without conversion. Moreover, local computer 140 may interface with remote computer 150 to generate the spatial orientation data.

In some embodiments, a quaternion transmission protocol provides a different notation for quaternion update packets wherein quaternions are encoded at different predefined bit positions or in a different predefined format than described above. For example, the bit length of the mantissa and exponent may be modified to increase or decrease the resolution of quaternions and thereby better comport with the tolerance for latency, power constraints and/or computational requirements of a particular system.

Moreover, in some embodiments, a quaternion transmission protocol provides a different notation for quaternion acknowledgement packets wherein timing correction data is encoded at different predefined bit positions or in a different predefined format than described above. For example, the resolution of the timing correction data may be increased or decreased by modifying the bit length of the timing correction data to comport with the maximum drift between frames that is observed empirically in a particular system.

The duration of TDMA frames and the number of time slots can also vary in different embodiments to accommodate different numbers of sensor units in the system. Additionally, the techniques for preserving resolution of values near +1 and −1 described herein have application not just to quaternions, but also non-quaternion values which are functions of sine and cosine.

It will be appreciated by those of ordinary skill in the art, therefore, that the present invention can be embodied in other specific forms without departing from the spirit or essential character hereof. The present description is considered in all respects to be illustrative and not restrictive. The scope of the invention is indicated by the appended claims, and all changes that come within the meaning and range of equivalents thereof are intended to be embraced therein.

What is claimed is:

1. A system for wireless transmission of quaternions, comprising:
a quaternion source configured to construct a quaternion update packet containing a quaternion at predefined bit positions and in a predefined fixed bit length format specified by a quaternion transmission protocol and transmit the update packet on a wireless communication link; and
a quaternion destination configured to receive the update packet off the wireless link and interpret the update packet, wherein the quaternion is expressed in the update packet in a compressed form.

2. The system of claim 1, wherein the fixed bit length format comprises mantissa bit positions and exponent bit positions.

3. The system of claim 2, wherein the fixed bit length format further comprises sign bit positions.

4. The system of claim 1, wherein the quaternion is encoded in the update packet in a format that provides increasing resolution of values of constituent elements of the quaternion with proximity to +1 and −1.

5. A system for wireless transmission of quaternions, comprising:
a quaternion source configured to construct a quaternion update packet containing a quaternion at predefined bit positions and in a predefined fixed bit length format specified by a quaternion transmission protocol and transmit the update packet on a wireless communication link; and
a quaternion destination configured to receive the update packet off the wireless link and interpret the update packet, wherein the update packet further contains a quaternion flag at a predefined bit position specified by the quaternion transmission protocol signifying to the quaternion destination that the update packet contains the quaternion at the bit positions and in the fixed bit length format.

6. The system of claim 5, wherein the quaternion is expressed in the update packet as four bit sequences of a common length representing four constituent elements of the quaternion.

7. The system of claim 5, wherein the update packet is transmitted during a time division multiple access (TDMA) time slot assigned to the quaternion source and no other quaternion source.

8. The system of claim 5, wherein the quaternion represents a spatial orientation of the quaternion source.

9. The system of claim 5, wherein the quaternion source is configured to compute the quaternion based on measurements of acceleration, rotation and magnetic field.

10. The system of claim 5, wherein the quaternion source is configured to convert the quaternion into the fixed bit length format.

11. The system of claim 5, wherein the quaternion source comprises a motion sensor unit.

12. The system of claim 5, wherein the quaternion destination comprises a data hub.

13. The system of claim 5, wherein the quaternion destination comprises a client device.

14. A system for wireless transmission of quaternions, comprising:
a quaternion source configured to construct a quaternion update packet containing a quaternion at predefined bit positions and in a predefined fixed bit length format specified by a quaternion transmission protocol and transmit the update packet on a wireless communication link; and
a quaternion destination configured to receive the update packet off the wireless link and interpret the update packet, wherein the quaternion source is configured to receive from the quaternion destination a quaternion acknowledgement packet in response to the update packet and wherein the acknowledgement packet contains timing correction information signifying to the quaternion source a timing correction for a clock on the quaternion source.

15. The system of claim 14, wherein the acknowledgement packet contains a sequence number signifying to the quaternion source which update packet is being acknowledged.

16. The system of claim 14, wherein the quaternion source is configured to receive the acknowledgement packet during a time division multiple access (TDMA) time slot assigned to the quaternion source and no other quaternion source.

* * * * *